(12) United States Patent
Verhaeghe

(10) Patent No.: US 7,048,009 B2
(45) Date of Patent: May 23, 2006

(54) FLUID ACCUMULATOR

(75) Inventor: Jan Verhaeghe, Beveren (BE)

(73) Assignee: Groep Stevens International, Naamloze Vennootschap, (BE)

( * ) Notice: Subject to any disclaimer, the term of this patent is extended or adjusted under 35 U.S.C. 154(b) by 0 days.

(21) Appl. No.: 10/512,973

(22) PCT Filed: Apr. 30, 2003

(86) PCT No.: PCT/BE03/00077

§ 371 (c)(1),
(2), (4) Date: Oct. 27, 2004

(87) PCT Pub. No.: WO03/093680

PCT Pub. Date: Nov. 13, 2003

(65) Prior Publication Data
US 2005/0166984 A1    Aug. 4, 2005

(30) Foreign Application Priority Data
Apr. 30, 2002 (BE) .............................. 2002/0291

(51) Int. Cl.
*F16L 55/04* (2006.01)
(52) U.S. Cl. .......................................... 138/31; 138/30
(58) Field of Classification Search .................. 138/30, 138/31
See application file for complete search history.

(56) References Cited

U.S. PATENT DOCUMENTS

| | | | | |
|---|---|---|---|---|
| 3,084,717 A | * | 4/1963 | Purcell | ........................ 138/31 |
| 3,696,714 A | * | 10/1972 | Panigati | ..................... 92/170.1 |
| 4,714,094 A | | 12/1987 | Tovagliaro | |
| 4,738,339 A | * | 4/1988 | Taylor | .................... 188/322.19 |
| 4,749,071 A | * | 6/1988 | Taylor | .................... 188/322.19 |
| 4,777,869 A | * | 10/1988 | Dirkin et al. | .................. 92/248 |
| 5,368,073 A | * | 11/1994 | Murphy | ....................... 138/30 |
| 5,638,868 A | * | 6/1997 | Loran | ........................... 138/31 |
| 5,653,263 A | * | 8/1997 | Killing | ......................... 138/30 |
| 6,039,078 A | * | 3/2000 | Tamari | ........................ 138/30 |

FOREIGN PATENT DOCUMENTS

| | | |
|---|---|---|
| DE | 932949 | 7/1949 |
| EP | 0197911 | 10/1986 |
| FR | 1060812 | 11/1951 |
| GB | 2134984 | 8/1984 |

\* cited by examiner

*Primary Examiner*—James Hook
(74) *Attorney, Agent, or Firm*—Frommer Lawrence & Haug LLP; Marilyn Matthes Brogan

(57) ABSTRACT

This invention relates to a fluid accumulator comprising a wall (2) encompassing a reservoir (1) for receiving the fluid, part of the wall being elastically deformable. The wall (2) of the fluid accumulator comprises a first wall portion (2A) that is made of a first elastically deformable composite, with fibrous reinforcement material applied in a first density, and a second wall portion (2B) that is made of a second composite with fibrous reinforcement material applied in a second density and an elastic deformability that is the same as or different from the elastic deformability of the first wall portion, the density of the fibrous reinfrocement material in the first and second wall portion (2A, 2B) being different.

14 Claims, 1 Drawing Sheet

FLUID ACCUMULATOR

Figure 1:
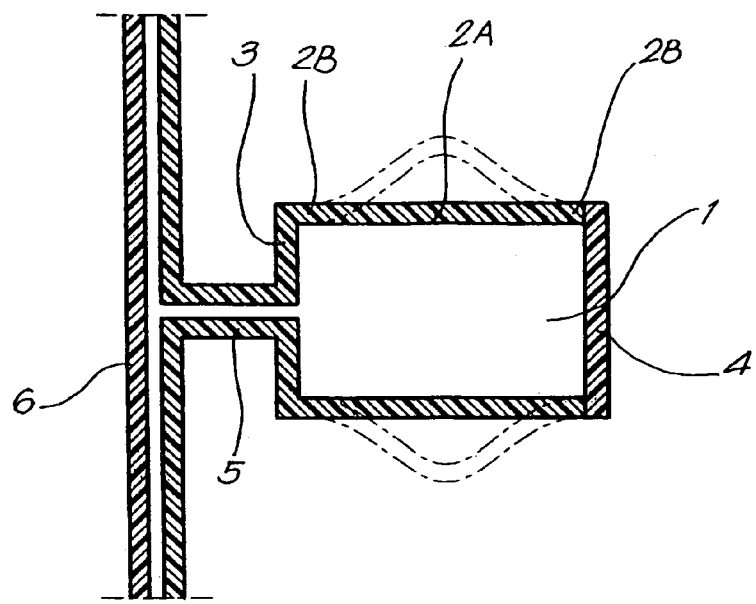

The invention relates to a fluid accumulator comprising a reservoir encompassed by a wall, part of the wall being elastically deformable, as described in the preamble of the first claim.

From EP-A-197.911 a pneumatic hammer drill is known, which comprises a hydraulic accumulator in the form of a cylinder surrounding a coaxial piston over part of its height. The cylinder is made of an elastic glass fibre reinforced epoxy resin, that provides the cylinder with the required resilient features and the accumulation capacity resulting there from.

From GB-A-2.134.984 a pressure vessel is known, for example for use as hydropneumatic accumulator, comprising a housing and a reservoir containing the pressure medium provided in the housing. The double-walled housing provides mechanical strength to the pressure vessel. The reservoir fitted in the housing is made of an elastomer and is provided to receive a gas. The space between the reservoir and the housing is provided to receive a liquid. Increasing the gas pressure in the reservoir, causes the reservoir to expand and liquid to be pressed out of the housing. The housing is made of a lining to which a fibrous reinforcement is applied.

However, for the hydropneumatic accumulator known from GB-A-2.134.984, the capacity of the pressure reservoir is determined by the volume of the housing.

U.S. Pat. No. 4,714,094 describes a gas-oil pressure accumulator having a cylindrical body reinforced by an envelope of a load-bearing composite material. A piston slideable in the cyclindrical body separates the hydraulic oil chamber from the pressurized gas chamber. The accumulator described in U.S. Pat. No. 4,714,094 is used as emergency unit in flight, and is able to supply a sufficient quantity of hydraulic oil as long as the hydraulic oil is kept under pressure by the pressurized gas. This type of accumulator is operated under high gas pressure, and therefore has a heavily reinforced cylindrical structure. The cylindrical wall of the accumulator described in U.S. Pat. No. 4,714,094 is essentially undeformable under load. Moreover the pressurized gas chamber has limited extensibility and is not able to contain a variable amount of gas, the amount of gas being dictated by the compressibility of the gas used.

Other known accumulators are similar to, for example, expansion vessels for central heating and consist of a vessel that is divided into two parts by a membrane. At one side of the membrane a gas under pressure is contained. The space at the other side forms said closed reservoir for the fluid, the membrane forming the elastically deformable wall portion. The construction of these accumulators is relatively expensive. In addition, the vessel may rust and the membrane may lose its elasticity or display leaks over time, causing the life span of these accumulators to be limited.

It is the aim of the present invention to provide a fluid accumulator, that can be manufactured relatively easily and that possesses a long life span.

This aim is reached according to the invention with the technical features of the characterizing part of the first claim.

The fluid accumulator of this invention contains a reservoir encompassed by a wall for receiving the fluid, at least a portion of the wall being elastically deformable. In order to allow pressure buildup the reservoir is closed or closable. The wall comprises a first wall portion made of a first elastically deformable composite, that is preferably flexible, and that is provided to elongate under pressure. The fibrous reinforcement material is applied in a first density. The fluid accumulator further comprises a second wall portion made of a second composite with fibrous reinforcement material applied in a second density and having an elastic deformability and expansibility that is equal to or differs from the elastic deformability of the first wall portion. The density of the fibrous reinforcement material in the first and second wall portion (2A, 2B) is different.

The density of the fibrous reinforcement material in the first and second wall portion is adjusted to the desired expansibility of the wall portion in question and is lower in the wall portion with increased expansibility, and higher in the wall portion with lower expansibility.

As a result of expansion or transformation of the elastically deformable wall portion this accumulator can contain a variable amount of fluid, usually gas or liquid. Such accumulators may be part of a pressure cylinder or may be connected to a pressure cylinder, for example a pressure cylinder of a hydraulic suspension, to collect the liquid that is pressed out of the cylinder by the piston or to press this liquid back to the cylinder when the piston returns to its starting position.

The first expandable wall portion is preferably only part of a wall or cylinder shell.

The first expandable wall portion of the accumulator can for example be part of a cylinder with a closed end in which a piston is movable to and from the closed end, between a minimum and a maximum inserted position. In that case the first wall portion preferably extends over the distance between the closed end and the maximum inserted position of the piston.

The fluid accumulator described higher is suitable for use in a hydraulic or pneumatic suspension with built-in accumulator or compensator, a shock absorber, a hydraulic cylinder for dampening motions etc.

The fibrous reinforcement material used in the first wall portion can be the same as or different from the fibrous reinforcement material used in the second wall portion. The fibrous reinforcement material itself may display a greater or smaller reversible elasticity. Expansion of the first wall portion can take place with or without stretching the fibrous reinforcement material. Elasticity of the fibrous reinforcement material can be obtained by applying the fibres in one or several previously determined directions. In practice, this is obtained by positioning the reinforcement fibres at an angle of less than 90° with respect to the longitudinal axis of the reservoir.

The expansibility of the first and second wall portions can be further controlled by orientating the fibres in the first wall portion at a first angle with respect to the longitudinal axis, and by orientating the fibres in the second wall portion at a second, different, angle with respect to the longitudinal axis The nature of the used fibrous reinforcement material is not critical to the invention and will usually be selected by the man skilled in the art taking account of the desired application. Suitable fibrous reinforcement materials are among others, metallic fibres, mineral fibres, for example glass fibres, carbon fibres, cotton fibres, flax etc; synthetic fibres for example made of polyester, polypropene, polyethylene, polyamid or mixtures of two or several of said materials. However, due to its high elongation to break ratio a polyester fibre is preferred. The form in which the fibrous reinforcement material is used will usually be adjusted by the person skilled in the art to the desired application in view of the expected elasticity and pressure resistance. For this, use can be made of a mat or tissue or a non-woven material, of twined or twisted fibres in order to provide improved elongation to break.

The fibrous reinforcement material used in the first and second wall portion may be identical or different, but is preferably different. For instance, in the first wall portion with increased expansibility use is made of glass fibres while in the second wall portion with lower expansibility preferably fibres with greater stiffness and strength, for example carbon fibres or polyester fibres, are used.

The nature of the plastic used in the fluid accumulator is not critical to the invention and will usually be adjusted by the man skilled in the art to the desired application. Suitable plastics are among others thermoplastics or a mixture of two or more thermoplastics, a thermosetting resin or a mixture of two or more thermosetters, an elastomer or a mixture of two or more elastomers, or a mixture of two or more thermoplastics, thermosetting resins or elastomers. However, elastomers and thermoplastics are preferred because of their flexibility and the optimal reversible character of their expansibility.

Examples of suitable thermoplastics are amorphous, crystalline and semi-crystalline materials. Examples of suitable thermoplastics are one or more materials of the group of polyurethane, polyethylene, polypropylene, ethylene-propylene copolymers, polybutadiene rubber or a mixture of two or more of these substances. Examples of suitable thermosetting resins are polyurethane, vinylester resins, unsaturated polyester resins, or a mixture, of two or more of these materials. Examples of suitable elastomers are polyurethane, polypropylene, ethylene-propylene copolymers, polybutadiene rubber. These materials may be amorphous crystalline as well as semi-crystalline, depending on the desired application.

Preferably use is made of a vinylester resin or of a polyurethane elastomer.

The first and second wall portion may be made of the same plastic, but are preferably made of different plastics in order to enable better control of the expansibility of the individual wall portions.

By adjusting the nature of the fibrous reinforcement material and the plastic in the first and second wall portion to the desired expansibility, optimal control of the expansibility of each of the first and second wall portions can be provided.

The invention also relates to a method for manufacturing the previously described fluid accumulator.

According to this method a cylinder shell comprising a fluid reservoir encompassed by a wall, is provided with a first expandable wall portion made of a fibrous reinforced composite and a different plastic material, fibrous reinforcement material or both, are used at the position where the first expandable wall portion transfers into the second expandable wall portion that displays reduced or hardly any expansibility, and this cylinder shell is closed by end walls.

One of the end walls can be manufactured as a piston and slidably mounted in the cylinder shell, the expandable portion of the cylinder shell being fitted between a fixed end wall and the piston in maximum inserted position.

The wall of the fluid accumulator can be manufactured in several ways. The most suitable method will be selected by the person skilled in the art in view of the desired application.

It is possible, for instance, to manufacture the wall by "filament winding". The fixed end wall or end walls can be manufactured by "filament winding" as well, in one piece with the cylinder shell. Filament winding is a technique according to which fibres or fibre strands are soaked in plastic and wound on a rotating mandrel or cylinder in the desired form, after which the plastic sets.

In another embodiment the cylinder shell is manufactured by "braiding", a technique according to which a woven sleeve soaked in plastic, is cured usually in a mould in a vacuum. "Braiding is described among others in the American patent publications 260,143 and U.S. Pat. No. 4,326,905.

In yet other embodiments the cylinder shell is manufactured by a combination of "filament winding" and "pultrusion", i.e. by the so-called "pullwinding" or by a combination of, "braiding" and "pultrusion". Pultrusion is a commonly known technique, according to which wires or mats are soaked with curable resin that are pulled through a mould, after which the resin is allowed to cure. "Pulwinding" is a variant of pultrusion in which one or more layers of reinforcement fibres are wound, which layers are soaked in plastic prior to or after the winding. Next the whole is pulled through an extrusion machine, after which the plastic cures. In these embodiments with "pultrusion" the fixed end of the cylinder must be manufactured separately, preferably also from composite material, possibly from elastically deformable plastic.

Figure 2:
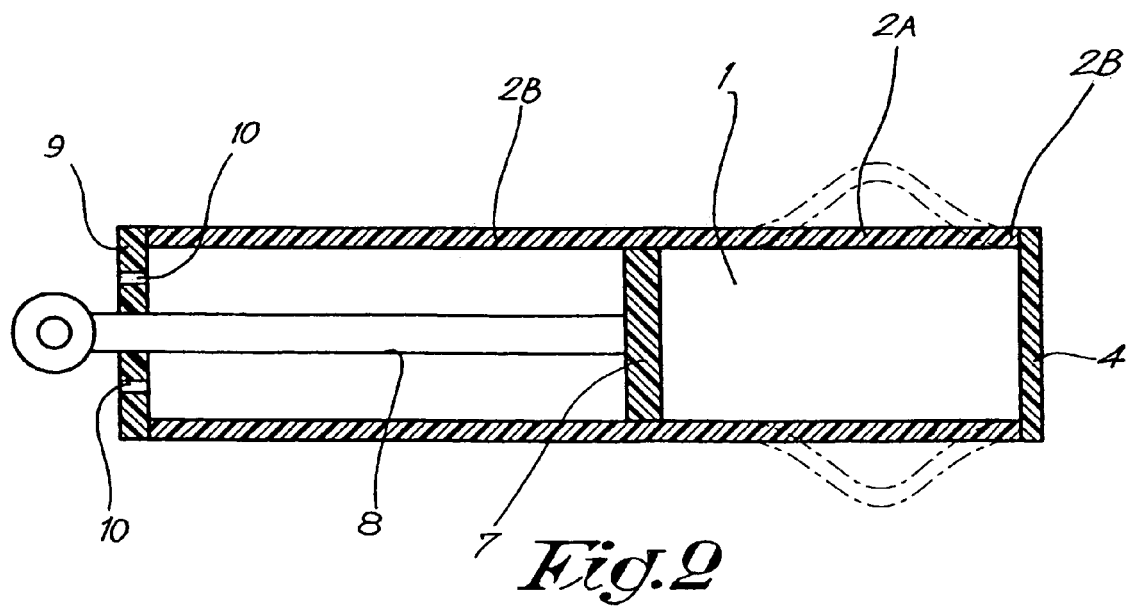

The invention is further clarified by the attached figures and figure description, in which FIG. 1 displays a schematic cross section of a fluid accumulator according to the invention;

FIG. 2 displays a schematic cross section analogous to that of FIG. 1, but relating to another embodiment of the accumulator, namely as suspension.

The fluid accumulator, displayed in FIG. 1, comprises a reservoir 1 for receiving the fluid, for example a gas, or a liquid. The reservoir is surrounded longitudinally by aside wall 2 and contains at opposite ends of the side wall first and second end walls 3 and 4. The reservoir, may have any desired shape, and can be, for example, cylinder-shaped or beam-shaped or have any other shape depending on the desired application.

The side wall 2 and the end walls 3 and 4 are made of a composite, i.e. a fibrous reinforced plastic.

The side wall 2 comprises a first expandable wall portion 2A. The first wall portion is preferably made of an elastically deformable, reversibly expandable plastic material. The side wall 2 also comprises a second wall portion 2B that displays reduced expansibility. The second wall portion can be made of the same plastic material, but will usually be made of a plastic with reduced elastic transformability and expansibility.

During the production process, for example by "filament winding", the less expandable part is made of a plastic with reduced elasticity and transformability and/or the fibres are applied in a greater density. The flexibility and elasticity can also be controlled by executing the non-expandable part 2B with a greater thickness than the first expandable part 2A. It is possible to control the elasticity by busing a different fibrous reinforcement material in the first and second wall portions. It is also possible, during the "filament winding", to apply the fibres crosswise, at an angle of less than 90° with respect to the axis of the reservoir 2 and to use a different winding method in the first and second part.

In another embodiment of the invention the entire wall of the reservoir is elastic.

The end walls 3 and 4 can be manufactured in a mould, from non elastically deformable plastic, for example an epoxy resin or a polyester, provided with fibrous reinforcement material. Both the plastic and the fibrous reinforcement material may be the same as, or different from the material of which the wall 2 of the reservoir is made. The end walls may be attached to the wall 2 in several ways, for example by means of gluing with an epoxy glue, or they may be part of them. This will usually depend on the manufacturing technique that is used.

However, in a variant one or both end walls 3 and 4 may also be made of elastically deformable material, for example of a polyurethane elastomer.

The end wall 3 may also be provided with a connection 5 for connecting a supply line 6.

In an alternative embodiment the cylinder shell 2, in one piece with the end walls, 3 and 4 or not, is made by "braiding" in stead of "filament winding". In a further alternative embodiment the cylinder shell 2 is manufactured by a combination of filament winding and pultrusion, i.e. by the so-called pullwinding or by a combination of braiding and pultrusion. In these variants the end walls 3 and 4 are usually made separately.

FIG. 2 shows the fluid accumulator described above, that is used in an hydraulic suspension with built-in accumulator. In this hydraulic suspension the end wall 3 is replaced by a piston 7 that is movable to and from the opposite end wall 4. A piston rod 8 is fixed to piston 7. In this embodiment the non expandable wall portion 2B is executed longer and extends over the full travel of the piston 7. The expandable wall portion 2A is located between the end wall 4 and the piston 7 in maximum inserted position.

The piston 7, if so desired in one piece with the piston rod 8, is made of composite material in a mould, but it can also be made by filament winding or braiding.

The end of the cylinder shell 2 through which the piston rod 8 extends outward is open, or partly closed, for example by a wall 9 with openings 10 that forms a guide for the piston rod 8. The wall 9 is preferably also made of composite material and glued to the cylinder shell 2 or is made as a whole. With the cylinder shell 2 by "filament winding" or "braiding".

When the piston rod 8 is pushed in, pressure is exerted on the fluid in the reservoir 1 resulting in the expansion of the wall portion 2A of the cylinder shell. When piston 7 is pushed out, the pressure on the fluid decreases and the expandable wall portion 2A returns to its original form entirely or partially, depending on the pressure decrease.

The accumulator of this invention is suitable for use with various types of fluids, for example water, oil or every other liquid, or a gas. In the last case the expansibility of the first wall portion 2A is subject to less demands.

The suspension may be used in vehicles, as a shock absorber, or as dampener for absorbing shocks in machines or for tempering motion in cranes.

The invention is in no way limited to the embodiment described above and displayed in the attached figures, but such fluid accumulator and method for manufacturing thereof can be realized in several variants without exceeding the scope of the invention.

The invention claimed is:

1. A fluid accumulator comprising a closable reservoir for receiving the fluid under a working pressure, which is enclosed by a circumferential side wall and a first and second end wall on opposite end parts of the circumferential side wall, wherein the circumferential side wall comprises in the longitudinal direction, a first circumferential wall portion made of a first elastically deformable composite material, which is deformable under the action of the mean working pressure and a second circumferential wall portion made of a second composite material, which is essentially undeformable under the action of the working pressure.

2. The fluid accumulator according to claim 1, characterized in that the first and second composite material comprise a fibrous reinforcement material and in that the density of the fibrous reinforcement material of the first composite material differs from the density of the fibrous reinforcement material of the second composite material.

3. The fluid accumulator according to claim 2, characterized in that the wall is made entirely of a fibrous reinforced composite, the composite containing a plastic material and the plastic material of the first wall portion being an elastic plastic material, provided to elongate reversibly under pressure.

4. The fluid accumulator according to claim 1, characterized in that the composite material of the first wall portion contains a first plastic and the second wall portion contains a second plastic material that displays a different elastic deformability.

5. The fluid accumulator according to claim 1, characterized in that the first and second composite material comprise a fibrous reinforcement material and in that the fibers of the fibrous reinforcement material in the first and second wall portion are orientated at different angles with respect to the longitudinal axis of the reservoir.

6. The fluid accumulator according to claim 5, characterized in that the angle is less than 90°.

7. The fluid accumulator according to claim 1, characterized in that the first and second composite material comprise a fibrous reinforcement material and in that the fibrous reinforcement material applied in the first wall portion are glass fibers.

8. The fluid accumulator according to claim 1, characterized in that the first and second composite material comprise a fibrous reinforcement material and in that the fibrous reinforcement material applied in the second wall portion are carbon fibers and/or polyester fibers and/or aramid fibers.

9. The fluid accumulator according to claim 1, characterized in that the first and/or second composite material comprises a vinylester resin.

10. The fluid accumulator according to claim 1, characterized in that the reservoir is enclosed by an essentially cylindrical side wall, an end wall and wall of piston, which piston is slidably mounted into the accumulator to move to and from end wall, and that the first wall portion extends between the end wall and the piston when in a position of maximum displacement in the direction of the end wall.

11. The fluid accumulator according to claim 10, characterized in that at least part of the piston comprises a fiber-reinforced composite.

12. The fluid accumulator according to claim 1, characterized in that the wall essentially consists of composite material which has been manufactured by filament winding, braiding, a combination of filament winding and pultrusion, pullwinding, a combination of braiding and pultrusion.

13. The fluid accumulator according to claim 1, characterized in that the first and second wall portion essentially consist of composite material manufactured using different techniques.

14. A hydraulic or pneumatic suspension with built-in accumulator or compensator, a shock absorber or a hydraulic cylinder for dampening motions which comprises the fluid accumulator according to claim 1.

* * * * *